Figure 1:
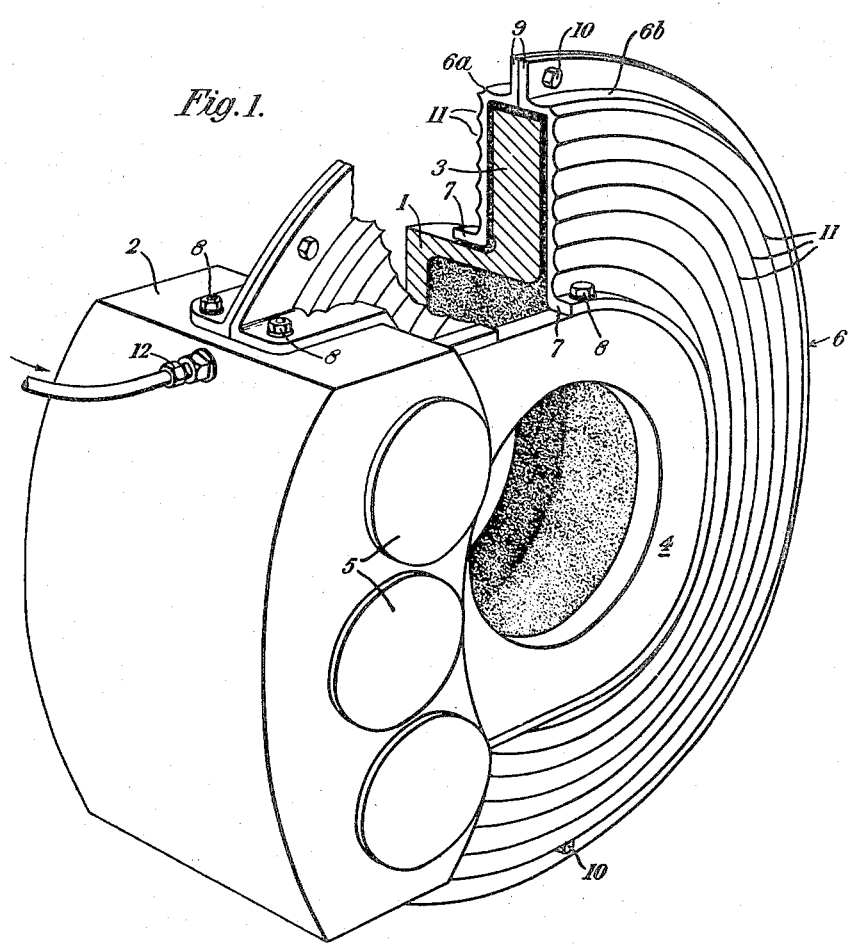

May 22, 1956  H. J. BUTLER  2,746,577
BRAKE WITH DUST SHIELD
Filed June 5, 1951  2 Sheets-Sheet 1

INVENTOR
Henry James Butler
by Benj. T. Rauber
his attorney.

United States Patent Office 2,746,577
Patented May 22, 1956

2,746,577
BRAKE WITH DUST SHIELD

Henry James Butler, Sutton Coldfield, England, assignor to Dunlop Rubber Company Limited, London, England, a British company Application June 5, 1951, Serial No. 229,967

Claims priority, application Great Britain June 7, 1950

4 Claims. (Cl. 188—264)

This invention relates to brakes, and more particularly to brakes for motor vehicles.

Disc brakes for aircraft are known and comprise an annular member rotatable with a wheel, non-rotatable friction pads to fricitionally engage the radially extending sides of the disc and fluid-pressure operated mechanisms to effect said engagement.

When the aircraft is braked the kinetic energy is converted to heat in the brake assembly and more particularly in the brake disc, and unless this heat is speedily dissipated the brake disc is liable to distort, the friction pads char and the condition known as "brake fade" sets in. One of the major advantages of a disc brake construction of the type hereinbefore described is that the greater portion of the disc revolves in air which cools the disc and prevents the build-up of heat therein.

When a disc brake of the type described hereinabove is used in a road vehicle however, it is found that dust and road dirt adhere to the radially extending sides of the disc with the result that when the brakes are applied, the disc is scored and abraded by particles of grit and the like whilst the pads of friction material are very rapidly worn down.

One type of disc brake for vehicles comprises an annular disc provided on its inner periphery with an annular, axially-extending flange which is bolted to the rotatable hub of the wheel. An inverted housing of U-section straddles a portion of the disc and one arm of the housing is provided with a flange, said flange being bolted to an annular flange solid with a non-rotatable part of the wheel. Each of said arms comprises a pair of hollow cylinders in side by side relationship, their centres lying on an arc of a circle co-axial with the wheel and their longitudinal axes extending axially of the wheel. Each cylinder is provided at one end with a closure member and a conduit connects said cylinder to a source of pressure fluid. A plunger is slidable in each cylinder and a pad of friction material secured to one end of said plunger is adapted to frictionally engage the disc when the fluid within the cylinder is pressurized.

An object of this invention is to provide a brake for road vehicles provided with means for preventing the braking surfaces of the brake member from becoming contaminated with road dirt and the like whilst at the same time not substantially reducing the rate of heat dissipation.

Another object of the invention is to provide a brake for aircraft wherein means are provided for preventing the braking surface from becoming contaminated with dust, dirt and the like. Some aircraft brakes are so constructed as to enable a stream of compressed air to be directed across the braking surface in order to cool said surface, and yet another object of the invention is to provide means for maintaining said airstream in intimate contact with the surface to be cooled.

According to the invention a vehicle brake comprises a rotatable braking member and a non-rotatable shrouding element closely spaced adjacent the braking surface thereof. The braking member may be a drum or a disc and the element is preferably made of a metal of high thermal conductivity having a thickness of the order of $\frac{1}{32}$ inch and spaced about $\frac{1}{8}$ inch from the said braking surface and parallel thereto.

Figure 2:
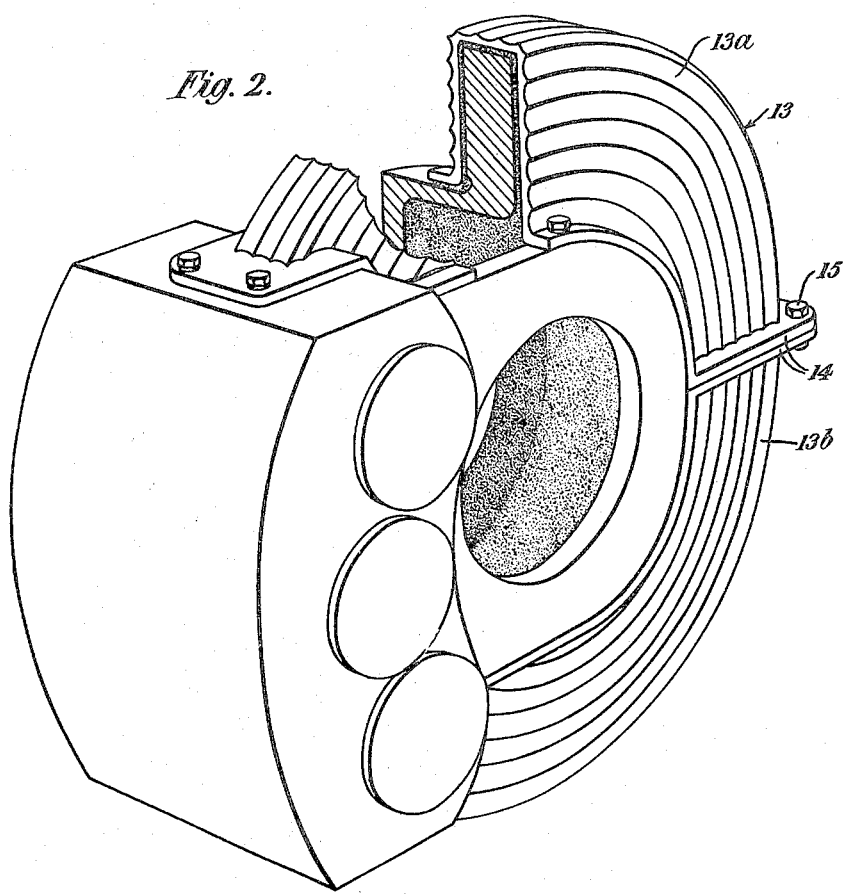

In order that the invention may be more fully described, reference is made to the accompanying drawings, of which:

Figure 1 is a part-sectional perspective sketch of one embodiment of the invention, and Figure 2 is a part-sectional perspective sketch of another embodiment of the invention.

In one embodiment of the invention (Figure 1) a road vehicle disc brake comprises an annular brake disc 1 of dog-leg section secured at its inner periphery to a rotatable wheel (not illustrated). A bifurcated housing 2 straddles a portion of the outer peripheral part 3 of the disc, and one bifurcation of the housing is provided integrally with a flange 4 to be secured by bolts to a non-rotatable part of the axle assembly. Each bifurcation of the housing is provided with three axially-extending cylinders provided at their outer ends with closure members 5. A plunger (not illustrated) is slidably fitted in each cylinder and a pad of friction material (not illustrated) is also slidably fitted in each cylinder, between the plunger and the disc part 3. The cylinders are provided with a connection (not illustrated) communicating with a source of pressure fluid. Thus when the cylinders are pressurized the pads of friction material are forced into frictional engagement with the part 3 of the brake disc 1, so braking the wheel.

The part 3 of the brake disc exterior of the housing is provided with a thin metal element 6 shrouding the radially-extending sides and outer periphery thereof. Said element 6 is part-annular in shape, a cut-out portion being provided to accommodate the brake housing to which the element is secured. The element is in two parts 6a and 6b, being divided circumferentially around its outer periphery to facilitate assembly to the brake disc part 3. Each element part is provided at its inner periphery with an axially extending flange 7, holes being provided therethrough whereby the said parts may be secured by bolts 8 to the brake housing 2, and flange 4. The outer periphery of each part is provided with a radially extending flange 9, holes being provided therethrough, and nuts and bolts 10 are provided to secure said parts rigidly together.

When the element is fitted to the disc the insides of the radially-extending walls are spaced close to the braking walls of the disc. The outer sides of the walls of the element are provided with a plurality of circumferentially extending ribs and grooves 11 which provide an increased radiating surface, give increased stiffness and to a certain extent protect the element from damage by stones and the like.

In some aircraft and large road vehicles means are provided for the supply of compressed air, and this compressed air is advantageously used to cool the braking member when it has been heated by application of the brakes. To ensure efficient cooling of the member by these means the stream of cooling air should preferably be maintained in close contact with the members for as long as possible.

In the embodiment of the invention shown in Figure 1 the housing 2 is provided with a connection 12 which is adapted to lead to a source of pneumatic pressure. A conduit (not illustrated) leads from said connection to a location between the two arms of the housing adjacent the outer periphery of the disc part 3. A stream of compressed air may thus be directed at will or during the braking operation on to the outer periphery of the disc and this cooling stream is forced to pass over the braking walls of the disc and out of the shrouding element at the inner periphery thereof. The disc may thus be more speedily cooled.

Figure 2 shows another embodiment of the invention in which the shrouding element 13 is divided radially into two separate parts 13a and 13b. The adjacent ends of the two parts are each provided with a flange 14 and said flanges abut and are secured together by nuts and bolts 15. This embodiment of the invention, which is not provided with means for cooling the disc by a stream of compressed air, is in all other respects similar to the embodiment hereinabove described.

A similar type of shrouding element may also be used in conjunction with the type of drum brake wherein the friction pads contact only a small portion of the axially extending wall of the drum. In this case the element is spaced close to the braking surface of the drum, which is normally the inner periphery of its axially-extending wall, and prevents contamination by road dirt and the like whilst at the same time not substantially reducing heat dissipation by radiation.

The shrouding element may be made of any type of heat-conductive metal and is preferably thin, so that heat, transferred from the disc by radiation is speedily conducted through the element, and is then dissipated to the atmosphere by radiation. The ribs and grooves, which may, e. g. be radially extending and not circumferentially extending as herein described, materially increase the radiating surface of the element. The element may conveniently be made of woven metal fabric or the like.

When the braking element is cooled by means of a stream of compressed air or the like the shrouding element need not necessarily be made of a heat conductive metal, but may be made e. g. of a thermoset plastic composition.

Having described my invention, what I claim is:

1. A vehicle brake comprising an annular, rotatable disc, non-rotatable brake applying means covering a sector portion only of the braking service of said disc, and a non-rotating, heat dissipating, shroud element completely covering the remaining portion of said disc and having walls closely spaced from the side faces of said remaining portion of said disc to form an unobstructed space for the radiation of heat between said walls and said disc and exposed to the atmosphere and sealed to said brake applying means to completely enclose said disc.

2. The brake of claim 1 in which said shroud element comprises two side plates joined outside the circumference of said disc.

3. The brake of claim 1 in which said brake applying means extends about the axis of rotation of said disc and said shroud element is secured and sealed to said part extending about said axis of rotation.

4. The brake of claim 1 in which the side walls of said shroud element are substantially parallel to the sides of said disc.

References Cited in the file of this patent
UNITED STATES PATENTS

| | | |
|---|---|---|
| 878,454 | Caillet | Feb. 4, 1908 |
| 1,727,486 | Sauzedde | Sept. 10, 1929 |
| 2,013,945 | Babbitt | Sept. 10, 1935 |
| 2,063,024 | Bendix | Dec. 8, 1936 |
| 2,466,990 | Johnson et al. | Apr. 12, 1949 |
| 2,496,699 | Clark | Feb. 7, 1950 |
| 2,657,772 | Chamberlain | Nov. 3, 1953 |